United States Patent [19]

Scott, IV.

[11] 4,211,578
[45] Jul. 8, 1980

[54] METHOD OF PRODUCING A CARBON BLACK SILICA PIGMENT

[75] Inventor: Oscar T. Scott, IV, Borger, Tex.

[73] Assignee: J. M. Huber Corporation, Rumson, N.J.

[21] Appl. No.: 46,738

[22] Filed: Jun. 8, 1979

[51] Int. Cl.² .......................... B01J 2/04; C09C 1/28; C09C 1/56; C09C 1/60

[52] U.S. Cl. .................... 106/307; 23/313 AS; 23/314; 106/288 B; 106/308 B; 264/13; 264/117

[58] Field of Search ............... 106/307, 308 B, 288 B; 264/13, 117; 23/313 AS, 314

[56] References Cited

U.S. PATENT DOCUMENTS

| | | | |
|---|---|---|---|
| 3,094,428 | 6/1963 | Hamilton et al. | 106/307 X |
| 3,390,006 | 6/1968 | Takewell et al. | 106/307 X |
| 3,406,228 | 10/1968 | Hardy et al. | 264/13 X |
| 3,597,170 | 8/1971 | Dollinger | 264/117 X |
| 4,155,772 | 5/1979 | Birchall et al. | 106/307 |
| 4,158,690 | 6/1979 | Price et al. | 264/117 X |
| 4,159,913 | 7/1979 | Birchall et al. | 106/307 |

FOREIGN PATENT DOCUMENTS 1405755  9/1975  United Kingdom ............ 23/314

Primary Examiner—Helen M. McCarthy
Attorney, Agent, or Firm—Ernest A. Schaal; Harold H. Flanders

[57] ABSTRACT

A combined carbon black silica pigment is formed by forming a slurry of precipitated silica and producing a carbon black exhaust gas by the incomplete combustion of a hydrocarbon feedstock, then drying the silica slurry in a spray dryer with the heat of the carbon black exhaust gas to form a combined carbon black silica pigment having at least 28% by weight silica. The combined carbon black silica pigment is collected, pelletized and dried. The carbon black exhaust gas is quenched prior to entering the spray dryer.

6 Claims, 1 Drawing Figure

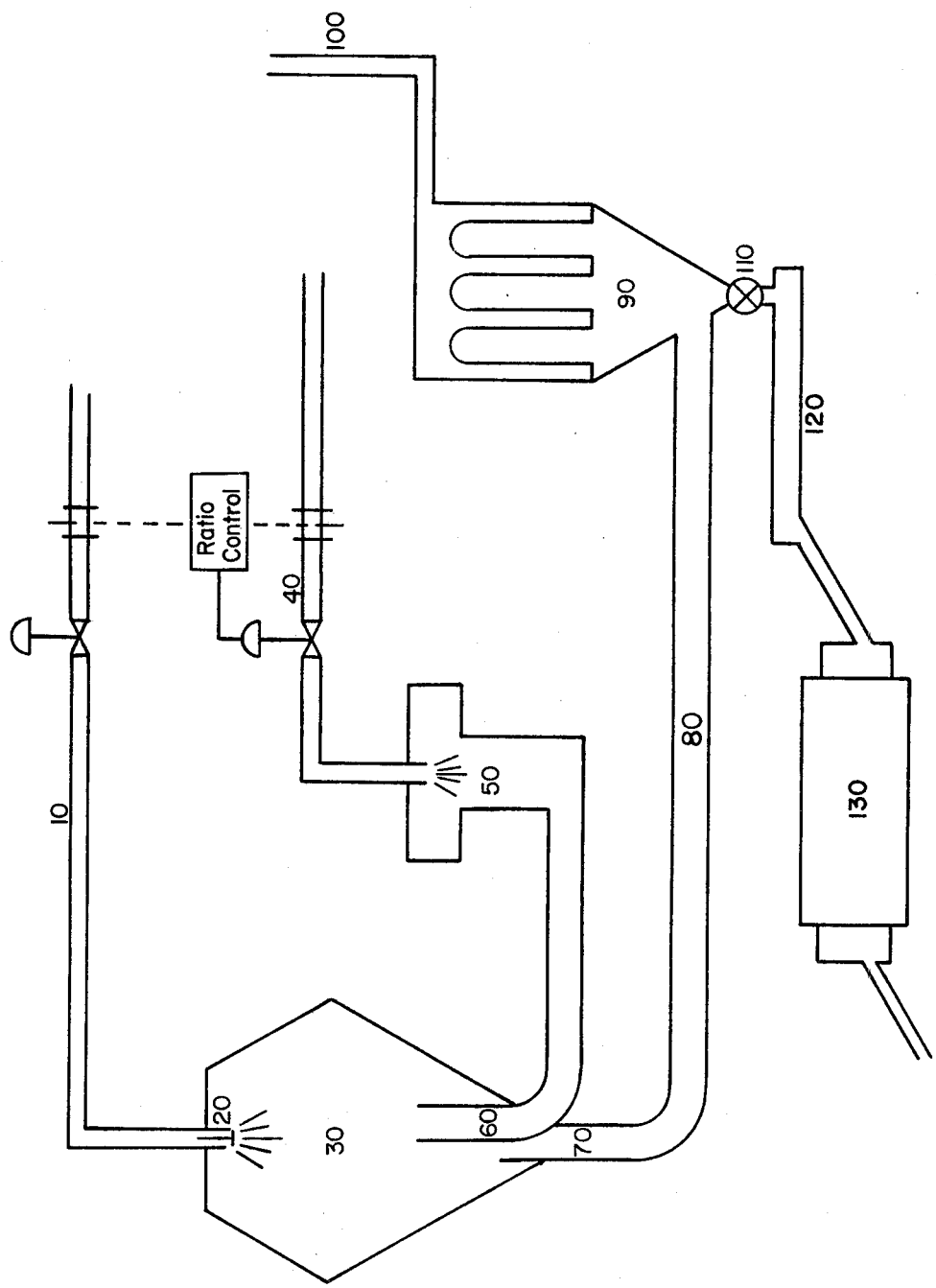

METHOD OF PRODUCING A CARBON BLACK SILICA PIGMENT

BACKGROUND OF THE INVENTION

1. Field of the Invention

The present invention relates to a method of producing a combined carbon black silica pigment useful in rubber compounds.

2. Description of the Prior Art

Combined Carbon Black Silicas

It is known that, for certain purposes, it is advantageous to use filler blends consisting of carbon black and silica for the reenforcement of natural and synthetic rubbers. These "black-silica-blends" provide good properties in rubber compositions used for the production of tire treads and breaker belts which are subject to dynamic stresses. It is possible with the use of such blends to achieve improved tear resistance and improved adhesion of rubber to wire cord and textile components in tires, belts, base and other products.

However, the addition of both filler components to the coproduct involves certain difficulties. There is always the danger that the components of the mixtures will separate during their delivery to the pelletizer from the storage vessel. Thus the ratio becomes inaccurate. It is difficult to mix fillers in powdered and pelletized form at the same time without disturbance of the carbon black granules. If one desired to produce granulates from both of the filler components in order to be able to supply them in such form to the coproduct, it would be necessary to moisten the carbon black which is produced in dry form and remoisten the precipitated and dried silica in order to be able to shape the mixtures. As the particles of the fillers have extraordinarily high surface areas, considerable quantities of water are required for this purpose.

Combined Carbon Black Silica Patents

U.S. Pat. No. 3,203,819 issued on Aug. 31, 1965 to Steenken et al. It teaches a reinforcing filler for rubber made by homogeneously mixing carbon black in substantially dry non-pelletized form with a light filler in the form of a primarily moist filter cake dough in the presence of sufficient quantity of water to produce an aqueous shapeable mass, then forming granules from this mass and drying such granules.

U.S. Pat. No. 3,317,458 which was issued on May 2, 1967 to Clas et al. teaches a process for the production of a vulcanizable premixture of a rubber, carbon black and silica. This process comprises admixing the carbon black and silica with a latex of the elastomer. The carbon black and silica being admixed with this latex is in the form of an aqueous extension of a mixture of a carbon black and silica prepared by precipitating amorphous finely divided silica from an aqueous water glass solution having carbon black suspended therein and washing the resulting suspension of carbon black and precipitated silica.

U.S. Pat. No. 3,390,006 issued on June 25, 1968 to Takewell et al and was assigned to the J. M. Huber Corporation. In this process, carbon black is produced in a carbon black furnace by incomplete combustion of a hydrocarbon oil and the products of combustion, including the carbon black, are quenched with a silica pigment water slurry. Then the carbon black silica pigment is collected, hammer milled, and pelleted.

Silicas

Commercially available synthetic silicas are derived either by a liquid phase or a vapor process. Silicas obtained by the vapor process are called fumed or pyrogenic silicas. Products obtained by the liquid process are categorized as silica gels and precipitated silicas. Thus, there are three distinct types of synthetic silicas on the market:

1. Pyrogenic Silicas

Pyrogenic or fumed silicas are prepared by reacting silicon tetrachloride vapor with oxygen and hydrogen gas at high temperatures. These products have high external surface areas and differ from other silicas (e.g., gels, precipitated silicas) prepared from the liquid phase process.

2. Silica Gels

Silica gels are of two types—hydrogels and aerogels. Hydrogels are prepared by reacting a soluble silicate such as sodium silicate with strong sulfuric acid. The gel is washed salt-free, dried, steam micronized, and then air classified. Aerogels are prepared from crude hydrogels by displacing its water content with an alcohol. The alcohol is then recovered by heating the gel in an autoclave.

Aerogels are lighter and fluffier than hydrogels because the shrinkage of the gel structure is avoided during the drying process. Gels have very large surface areas, generally in the range of 300–1000 sq m/g and high porosities.

3. Precipitated Silicas

Precipitated silicas are produced by the de-stabilization and precipitation of silica from soluble silicate by the addition of a mineral acid and/or acidic gases. The reactants thus include an alkali metal silicate and a mineral acid, such as sulfuric acid or an acidulating agent such as carbon dioxide.

Silica Patents

U.S. Pat. No. 3,445,189 issued on May 20, 1969 to Maat et al. Maat et al describes a process for producing a silica having a surface area of from 100 to 250 sq m/g, and an oil absorption of more than 200 cc/100 g. In this process, an alkali metal silicate and a strong mineral acid are added simultaneously to water at a temperature between 70° and 90° C. while maintaining the reaction pH between 7 and 9.

U.S. Pat. No. 3,730,749 issued on May 1, 1973 to Morgan. This patent discloses a process for preparing a finely divided silica pigment by acidification of an aqueous alkali metal silicate pool to precipitate a finely divided silica wherein alkali metal silicate is added to the partly acidified pool when the viscosity is between 50 and 500 at a rate sufficient that the viscosity of the pool does not exceed 500 centipoise.

U.S. Pat. No. 3,857,925 issued on Dec. 31, 1974 to Sirianni et al. This patent discloses a process for preparing silica by adding a mineral acid to a dilute alkali metal silicate solution containing from 1 to 3% by weight of silica to form a sol having a pH of about 4.5 to 6.5 and allowing the sol to set into a firm aquagel, then diluting and dispersing the aquagel in water to form an aqueous dispersion of aquagel seed particles, then mixing with the seed dispersion an alkali metal silicate solution and adding acid to the mixture at a temperature of about 75° to 100° C. to quickly lower the pH to about 1 to 4 and precipitate the silica. The wet precipitated silica is separated from the associated liquid and dried to form an amorphous pulverant dried silica.

U.S. Pat. No. 3,928,540 issued on Dec. 23, 1975 to Morgan. In this patent, a finely divided precipitated silica is prepared by acidifying an aqueous alkali metal silicate solution with acidifying agent until a slurry of finely divided precipitated silica is obtained, the slurry having reached a viscosity of at least 550 centipoise. Further alkali metal silicate is added to the slurry and the resulting mixture is acidified with further acidifying agent to precipitate a further finely divided silica.

U.S. Pat. No. 4,132,806 issued Jan. 2, 1979 to Wason and was assigned to the J. M. Huber Corporation. This patent discloses acidulating a solution of an alkali metal silicate with acid under controlled precipitated conditions. Then the aqueous reaction mixture is post conditioned by introducing a second silicate solution into the reaction vessel and thereafter adding additional acid to react with the second silicate solution.

British Pat. No. 1,445,575 issued on Aug. 11, 1976 to the J. M. Huber Corporation. In this patent, an aqueous sodium silicate solution is acidulated without addition of sodium silicate solution until precipitation begins, then the acidulation is continued while adding sodium silicate solution in a manner such that a constant pH is maintained in the range of 8 to 11 until precipitation is complete, then the pH is reduced to 5 to 7.

Silicate Patents

U.S. Pat. No. 2,739,073 issued on Mar. 20, 1956 to Bertorelli and was assigned to the J. M. Huber Corporation. In this patent, a dilute sodium silicate solution and a dilute aluminum salt are added slowly to a diluting aqueous medium to produce a precipitated sodium alumino silicate having a specific gravity of from 2.10 to 2.26 and substantially all of the particles are less than 0.5 microns in diameter.

U.S. Pat. No. 2,848,346 issued on Aug. 19, 1958 to Bertorelli and was assigned to the J. M. Huber Corporation. This patent teaches suspending a finely divided silica in a dilute aqueous solution of an aluminum salt, then adding a sodium silicate solution to the salt solution to precipitate a sodium alumino silicate. This sodium alumino silicate is separated from the solution, dried and disintegrated.

U.S. Pat. No. 3,746,559 issued on July 17, 1973 to Hackbarth et al. and was assigned to the J. M. Huber Corporation. In this patent, sodium silicate and aluminum are reacted in an aqueous medium with sodium sulfate to produce a sodium alumino silicate. The aluminum sulfate is added to the reaction zone as a separate stream for at least 10 seconds more than the normal batch procedure time for feeding separate lines of aluminum sulfate and sodium silicate to the reaction medium.

Carbon Blacks

Furnace carbon black is produced by the decomposition of vaporized liquid hydrocarbons or of mixtures thereof with normally gaseous hydrocarbons. Use commonly is made of feedstocks composed largely of heavy liquid hydrocarbons, for instance, heavy aromatic fractions or residues of the cracking of petroleum to produce motor fuels. The resulting carbon black, in contradistinction to "channel" black obtained by the decomposition of natural gas at lower temperatures, typically possesses an aggregated or chained particle structure.

As is discernible from electron micrographs, the individual or ultimate particles of the carbon have a marked tendency to link together in clusters, agglomerates or chains. These resist being broken apart or tend to reform if broken apart in the course of dispersion of the product, as in the milling of rubber compounds. Consequently, rubber vulcanizates reinforced with furnace black generally have a considerably greater modulus of elasticity, or less elasticity, than do those similarly reinforced with channel black.

Carbon Black Patents

U.S. Pat. No. 2,375,795 issued on May 15, 1945 to Krejci. A hydrocarbon gas is continuously mixed with air, both preheated to 538° to 1316° C. The amount of air is insufficient for complete combustion of the hydrocarbon gas. This mixture is introduced at the center of an inlet end wall of an unobstructed chamber having an inlet end wall, a cylindrical side wall and an open outlet end. The cross sectional area of the open outlet end is substantially the same as that of the chamber. The mixture is introduced in a direction parallel to the longitudinal axis of the chamber. The gas and air is then burned to maintain a temperature within the chamber of between 1093° and 1666° C. and a mixture of gas and at least sufficient air for substantially complete combustion of the gaseous fuel is introduced into a chamber near the inlet end wall through a burner port and this is burnt. The burner port is so positioned as to direct the flow of the gaseous fuel and the air in a direction tangent to the inner surface of the chamber side wall and essentially perpendicular to the longitudinal axis of the chamber. The mixture of gaseous fuel and air being introduced through the burner pot is of sufficiently high velocity and in sufficient quantity to maintain the flame and combustion products by centrifugal force adjacent to the whole inner surface of the chamber thus forming a separate layer of flame and combustion products between the side wall and the gas mixture in the chamber. Carbon black is separated from the products of combustion.

U.S. Pat. No. 2,917,370 was issued Dec. 15, 1959 to Edminster et al. This patent shows a process of producing carbon black by introducing into a heat insulated reaction chamber an atomized spray of hydrocarbon oil then establishing about the periphery of the spray a turbulent zone of combustion by introducing a plurality of diverging jets of a combustible gas adjacent to the periphery of oil spray and surrounding the gas jets and oil spray with a slow moving body of air in more than sufficient volume to support complete theoretical combustion of gas jets, but insufficient to support more than 50% theoretical combustion of all combustible materials introduced in the chamber, and then disassociating the major portion of hydrocarbon oil to carbon black.

U.S. Pat. No. 3,922,335 issued Nov. 25, 1975 to Jordan et al. This patent discloses establishing an enclosed stream of hot combustion gases having a linear velocity sufficient to atomize and disperse liquid hydrocarbon forming feedstock, then injecting the feedstock in a form of a plurality of individual coherent streams traversely into the combustion gas stream from the exterior periphery thereof, injecting the liquid feedstock in a form of a plurality of individual coherent streams outwardly and substantially traversely into the combustion gas stream from at least one location in the interior thereof, each of the coherent streams of feedstock being caused to penetrate the combustion gas stream to a depth sufficient to avoid sufficient contact of the feedstock with apparatus prior to mixing thereof with a hot combustion gas stream and forming solid carbon particles, quenching the reaction mixture and collecting the carbon black product.

U.S. Pat. No. 3,201,200 issued on Aug. 17, 1965 to Voet et al and was assigned to the J. M. Huber Corporation. This patent teaches producing carbon black in a furnace by vaporizing and pyrolizing a liquid hydrocarbon feedstock. The structure is controlled by dissolving in the feedstock precise amounts of a sodium salt of an organic acid and an oil-soluble free fatty acid.

U.S. Pat. No. 3,203,765 issued on Aug. 31, 1965 to Iannicelli et al and was assigned to the J. M. Huber Corporation. This patent teaches producing carbon black in a furnace by vaporizing and pyrolizing a liquid hydrocarbon feedstock. The structure is controlled by reacting with the feedstock precise amounts of a sodium base dissolved in a hydrocarbon miscible aliphatic alcohol.

Other Patents of Interest

U.S. Pat. No. 2,632,713 issued on Mar. 24, 1953 to Krejci. This patent teaches providing an axial stream in the gaseous state of a mixture of a hydrocarbon and a combustible compound of silicon, boron or germanium in the reaction zone. Air is supplied in sufficient quantity to combust a portion of the hydrocarbon, generating sufficient temperature within the reaction zone to decompose the unburned portion of hydrocarbon.

U.S. Pat. No. 3,094,428 issued on June 18, 1963 to Hamilton et al. This patent teaches a process for the production of a mixture of carbon black and the oxide of boron, silicon, aluminum, titanium, zirconium, zinc, lead, tin, iron, cobalt, nickel, manganese, chromium, vanadium, molybdenum, niobium or tantalum. The chloride, bromide, iodide, nitrate, acetate, oxalate or tartrate of the metal in vapor form is oxidized in an oxygen-containing reducing flame, the flame being supplied with an unsaturated hydrocarbon having from 2 to 8 carbon atoms.

U.S. Pat. No. 3,960,771 issued on June 1, 1976 to Tanaka et al. This patent teaches a composite adsorbent for the adsorption of gases comprising particles of activated clay and fine powder of active carbon. The composite can be formed by the use of two squeezing rollers.

BRIEF DESCRIPTION OF THE DRAWING

In order to facilitate the understanding of this invention, reference will now be made to the appended drawing. The drawing should not be construed as limiting the invention but is exemplary only.

The FIGURE shows a diagrammatic illustration of a suitable arrangement of apparatus for carrying out a particularly advantageous method embodiment of the invention.

SUMMARY OF THE INVENTION

Accordingly, it is an object of this invention to provide a new and highly effective process which overcomes the deficiencies of the prior art as described above.

It is a further object of this invention to reduce the energy required to form a combined carbon black silica pigment.

Another object of this invention is to reduce the capital investment needed for forming a combined carbon black silica pigment.

Still another object of the invention is to produce a uniform combined carbon black silica pigment.

Another object of this invention is to produce a carbon black silica pigment having improved dispersion.

Still another object of this invention is to produce a carbon black silica pigment having an increased pour density.

Another object of this invention is to produce a carbon black silica pigment having less dust.

Other objects and a fuller understanding of this invention may be had by referring to the following description and claims.

The present invention overcomes the deficiencies of the prior art and achieves its objectives by forming a silica or sodium alumino silicate slurry, preferably a slurry of precipitated silica, and producing a carbon black exhaust gas by the incomplete combustion of a hydrocarbon feedstock, then drying the silica slurry in a spray dryer with the heat of the carbon black exhaust gas to form a combined carbon black silica pigment. Preferably the temperature at the slurry inlet for the spray dryer is from 480° C. to 820° C., and the combined carbon black silica pigment has at least 28% by weight silica. The combined carbon black silica pigment is collected, and is preferably pelletized and dried. Preferably the carbon black exhaust gas is quenched to a temperature of from 800° C. to 1100° C. prior to entering the spray dryer.

DESCRIPTION OF THE PREFERRED EMBODIMENTS

In a preferred embodiment of the present invention, a combined carbon black silica pigment is formed by forming a precipitated silica slurry and producing a carbon black exhaust gas by the incomplete combustion of a hydrocarbon feedstock, then drying the silica slurry in a spray dryer with the heat of the carbon black exhaust gas to form a combined carbon black silica pigment having at least 28% by weight silica. The temperature at the slurry inlet for the spray dryer is from 480° C. to 820° C. The combined carbon black silica pigment is collected, pelletized and dried. The carbon black exhaust gas is quenched to a temperature of between 800° C. and 1100° C. prior to entering the spray dryer.

The resulting product has improved dispersion and is a more uniform product. It can be loaded faster in a banbury mixer and will incorporate in mixing faster than blended black and silica pellets. This product also has less dust and a higher pour density than the blended copellets. Because of the lower dust levels it is easier to handle than the blended copellets. Because of the higher pour density, there are freight rate savings when shipping this product.

In reference to the drawing, the silica slurry is piped through silica slurry pipe 10 to spray dryer 30, entering spray dryer 30 through silica inlet 20. The carbon black feedstock oil is piped through feedstock line 40 into the reactor 50 where it is converted into carbon black exhaust gas and then the exhaust gas proceeds into spray dryer 30 through carbon black inlet 60. The co-mixed carbon black and silica powder thus formed falls out bottom of the spray dryer 30 through spray dryer outlet 70, and it is piped through co-mixed carbon black silica line 80 to bag collector 90. At bag collector 90, the excess exhaust gas leaves by exhaust gas line 100. The carbon black silica leaves bag collector 90 through bag collector outlet 110 and enters into wet pinmixer 120. From wet pinmixer 120, the carbon black silica powder goes to dryer 130 and then the finished product is removed having a content of around 65% carbon black and 35% silica.

It has been found that when the silica is to be used as a filler for natural and synthetic rubbers and other elastomers, the surface area and the oil absorption are of vital importance.

The surface area is determined by means of the nitrogen absorption method of Brunauer, Emmett and Teller (J.A.C.S. 60,309,1938). The oil absorption is a measure of the porosity and is the quantity in cc of linseed oil/gram of silica just sufficient to be able to form a small ball of the silica modified Garner Coleman Oil Absorption Test. So, it has been found that production of silica, the surface area and oil absorption do not vary in parallel but a kind of satisfactory compromise must be obtained between surface area and oil absorption.

Extensive investigations have indicated that if a finely divided silica is to have good reinforcement properties for rubber it must have a surface of 100 to 250 sq m/g.

Either a silica slurry or a sodium alumino silicate slurry can be used. The slurry can be formed from the processes of any of the above prior art patents. U.S. Pat. Nos. 3,445,189; 3,730,749; 3,857,925; 3,928,540; 4,132,806; 2,739,073; 2,848,346; and 3,746,559 are incorporated by reference to show processes for making a silica or silicate useful in the present invention.

One advantageous silica that can be used in the present invention is Zeosyl 100 (a registered trademark of the J. M. Huber Corporation). Zeosyl 100 has a packed bulk density of from 14 to 17 lbs/cu ft; a density at 25° C. of 2.0 g/ml; a mean particle diameter of 14 to 22 millimicrons; an oil absorption of from 170 to 200 cc oil/100 g; a refractive index of 1.44 and a BET surface area of 120 to 150 sq m/g.

Another silica useful in the present invention is Arogen 500 (a registered trademark of the J. M. Huber Corporation), which has a packed bulk density of from 16 to 18 lbs/cu ft; a density at 25° C. of 2.07 g/ml; an oil absorption of 130 to 140 g/100 g and a BET surface area of from 200 to 250 sq m/g.

Another silica useful in the present invention is Zeo 45 (a registered trademark of the J. M. Huber Corporation) which is a precipitated fine particle hydrated silica having as typical properties a heating loss in 2 hours at 105° C. of 5%; a 5% pH of 6.8–7.5; a BET surface area of 132 sq m/g and a mean particle diameter of 22 millimicrons.

A sodium alumino silicate useful in the present invention is Zeolex 23 (a registered trademark of the J. M. Huber Corporation) which is an ultrafine white reinforcing pigment for rubber having a heating loss in 2 hours at 105° C. maximum as packed of 3.5 to 5.5; a pH of 20 grams Zeolex per 80 ml of water of 9.8 to 10.6. Typical properties are pack bulk density of 18 to 20 lbs/cu ft; a density at 25° C. of 2.10 g/ml; a mean particle diameter of 40 milimicrons; a refractive index at 20° C. of 1.55 and a BET surface area of 72 sq m/g.

The carbon black exhaust gas can be formed by any of the processes outlined in the carbon black patents noted above. U.S. Pat. Nos. 2,375,795; 2,917,370; 3;922;335; 3,201,200 and 3,203,765 are incorporated by reference to show methods of producing carbon black useful in the present invention.

Carbon black is formed by the incomplete combustion of a hydrocarbon feedstock which can be either of gaseous feedstock, a liquid feedstock or a mixture thereof. Preferably, the carbon black is N220.

DBP ABSORPTION

In accordance with the procedure set forth in ASTM D-2414-70, absorption characteristics of pelleted carbon blacks are determined. In brief, the test procedure entails adding dibutyl phthalate (DBP) to a pelleted carbon black sample until there occurs a transition from a free-flowing powder to a semiplastic agglomerate. The value is expressed as cubic centimeters (c.c.) of dibutyl phthalate (DBP) per 100 grams of carbon black. The carbon black of N220, after pelletizing thereof, is determined to have a DBP absorption value of 114 cc/100 g black.

IODINE SURFACE AREA

In this procedure, a carbon black sample is placed into a porcelain crucible equipped with a loose-fitting cover to permit escape of gases and is devolatilized for a 7 minute period at a temperature of 927° C. in a muffle furnace and then allowed to cool. The top layer of calcined carbon black is discarded to a depth of one fourth inch and a portion of the remaining black is weighed. To this sample there is added a 100 milliliter portion of 0.01 N iodine solution and the resulting mixture is agitated for 30 minutes. A 50-milliliter aliquot of the mixture is then centrifuged until the solution is clear, following which 40 milliliters thereof is titrated, using a 1% soluble starch solution as an end point indicator, with 0.01 N sodium thiosulfate solution until the free iodine is adsorbed. The percent of iodine adsorbed is determined quantitatively by titrating a blank sample. Finally, the iodine surface area expressed in square meters per gram is calculated in accordance with the formula $$\text{Iodine Surface Area} = \frac{(\% \text{ Iodine Adsorbed} \times 0.937 - 4.5)}{\text{Sample Weight}}$$

Employing this procedure the iodine surface area of N220 is 122 sq m/g.

TINT FACTOR

In U.S. Pat. No. 3,725,103, Jordan et al., Apr. 3, 1973 there is the relationship (hereinafter "tint factor") of (tinting strength + 0.6 ($D_a$)). $D_a$, the apparent diameter of the carbon black in millimicrons, can be obtained by use of the formula:

$$D_a = \frac{2270 + 63.5 \, (DBP \text{ absorption})}{\text{Iodine Surface Area}}$$

In the above equations the tinting strength is employed in terms of % of SRF, the DBP absorption is employed in terms of cc/100 g carbon black and the iodine surface area is employed in terms of sq m/g. Having knowledge of the tinting strength, DBP absorption and iodine surface area values of the carbon black of N220 the tint factor therefor is determined by substituting said known values into the equation:

$$\text{Tint Factor} = \text{tinting strength} + 0.6 \, \frac{2270 + 63.5 \, (DBP)}{\text{Iodine surface area}}$$

Accordingly, the tint factor of the carbon black of N220 is 114.

The silica and the carbon black exhaust gas are mixed in the spray dryer by the silica being sprayed from the top of the spray dryer and a carbon black exhaust gas drying the silica slurry and forming a co-mixture of the carbon black and silica powder. The operating conditions of the spray dryer are that the slurry inlet be at a temperature of between 480° C. and 820° C.; and that the carbon black exhaust gas be at a temperature of between 800° and 1100° C.

In the preferred mode, the carbon black containing the exhaust gas containing carbon black is primarily quenched to a temperature of 1000° C.

After the combined carbon black silica pigment is formed, the pigment is sent to a bag collector where the exhaust gas is vented to fire a dryer, a heat exchanger or any other type of equipment requiring energy input. The carbon black and silica is then passed out from the bottom of the bag collector.

After the carbon black and silica has been collected, it can be pinmixed then pelletized and dried. The pelletization can be either by a pinmixer or any other type of pelletizing equipment. Examples of pelletizing methods that would work in the present invention are covered in U.S. Pat. Nos. 2,699,381; 2,843,874; 3,391,234; 3,657,400; 3,993,739; and 4,005,170.

The invention will be further illustrated by the following examples which set forth particularly advantageous method and composition embodiments. While the examples are provided to illustrate the present invention, they are not intended to limit it.

OPERATING CONDITIONS

The spray dryer used was a Bowen Conical Laboratory Spray Dryer. Only the drying chamber and support frame were utilized; the heater, blower, and collection system were removed. Stated specifications for the dryer were: 250 scfm (7.08 cu. m/min) drying air rate, and heat load range of 50,000 to 230,000 BTU/hr (12,600 to 57,960 kcal/hr). Inlet for both drying gases and material to be dried was located top center of the drying chamber. The slurry to be dried was atomized through a bi-fluid spray located in the center of a 60 degree vaned inlet ring through which heated gases forced the atomized slurry into a vortex. Carbon black exhaust gases were used for drying energy.

A filter cake slurry of Zeosyl 100 was pumped from a 15 gallon (56.8 liter) stirred vessel to the spray dryer with a Sigmamotor variable speed tubing pump. The rate of slurry addition was calculated from the rate of black being produced over a 30 minute interval. Knowing the black rate and percent solids of the slurry, the amount of slurry needed for a dry 65/35% carbon black silica pigment was calculated. The slurry pump was calibrated prior to each run by weighing slurry input over a timed interval for a given rmp. All carbon black silica pigment runs were micropulverized, wet pinmixed, and roller dried prior to testing. Silica contents were estimated by ashing the coproduct.

CONTROL EXAMPLES

Example A was a spray dried silica. No oil was introduced into the furnace.

Example B was an N220 black produced immediately prior to and was the control for Example I.

Example C was an N220 black produced immediately prior to and was the control for Examples II and III.

Example D was an N220 black produced immediately prior to and was the control for Examples IV and V.

EXAMPLES I-V

Example I had a temperature at the inlet of the spray dryer of 488° C. and a bag filter inlet temperature of 99° C. Example II had a temperature at the inlet of the spray dryer of 516° C. and a bag filter inlet temperature of 132° C. Example III had a temperature at the inlet of the spray dryer of 516° C. and a bag filter inlet temperature of 127° C. Example IV had a temperature at the inlet of the spray dryer of 816° C. and a bag filter inlet temperature of 160°. Example V had a temperature at the inlet of the spray dryer of 810° C. and a bag filter inlet temperature of 171° C.

The furnace was operated with a total air rate of 73 scfm (2.07 cu. m/min); a total gas rate of 5.26 scfm (0.149 cu. m/min); an oil rate of 0.689 lb/min (312.5 g/min) and a quench water rate of 1.687 lb/min (765.0 g/min).

A 13.6% solids silica slurry was added to the spray dryer at a rate of 1.35 lb/min (610 g/min). The air at 100 psi (8.064 kg/sq cm) was equivalent to 10 scfm (0.283 cu. m/min) of free air.

The product rate off the bag filter was 32 lb/hr (1.45 kg/hr) at 2.36% moisture. The product pelletized easily although pills have substantial amount of lumps or "overs."

Physical and rubber properties are given in Tables I and II, respectively.

TABLE I

| | PHYSICAL PROPERTIES | | | | | |
|---|---|---|---|---|---|---|
| | Silica, | Iodine Ads. No. | Pellet Hardness | | | Pour Density |
| Example | % | mg/g | Avg. | High | Low | lbs/ft3 |
| A | 100 | | | | | |
| B | 0 | 130.7 | | | | |
| C | 0 | 125.8 | | | | |
| D | 0 | 121.7 | | | | |
| I | 25.9 | 89.9 | 23 | 40 | 15 | 23.9 |
| II | 35.1 | 83.9 | 22 | 42 | 15 | 23.5 |
| III | 33.5 | 83.2 | | | | |
| IV | 34.5 | | 24 | 30 | 19 | 22.3 |
| V | 34.5 | | 23 | 30 | 18 | 21.8 |

The commingled material was pelletized without difficulty in a batch pinmixer. 1.37 kg of water per kg of product were required versus 1.17 kg/kg for the base black. The copellets were slightly larger than straight carbon black pellets, i.e., 5.7% over 8 mesh and 6% over 10 mesh.

EXAMPLES VI-X

The procedures of Examples I-V are repeated except that the silica slurry rate is adjusted to provide a dry 60%/40% carbon black silica pigment.

EXAMPLES XI-XV

The procedures of Examples I-V are repeated except that the silica slurry rate is adjusted to produce a dry 70%/30% carbon black silica pigment.

The combined carbon black silica pigment copellets were evaluated in the following off-the-road formulation:

|  | Parts by weight |
|---|---|
| Natural rubber | 100 |
| Carbon black silica pigment | 57.0 |
| Zinc oxide | 5 |
| Stearic acid | 3 |
| Santoflex DD | 0.5 |
| Flectol H | 1.5 |
| Pine tar | 5.0 |
| Turgum S | 2.0 |
| MBTS | 0.8 |
| Sulfur | 2.8 |

Additional N220 black was added during the compounding, when necessary, to achieve a silica/black composition of 17/40, respectively. The data indicates that the reinforcing properties of the copellets are fully equivalent to prior art blends.

TABLE II

RUBBER PROPERTIES

| Example | 300% Modulus, psi | Tensile, psi | Tear Die °C., psi | Flexometer HBU, °F. | Mooney Scorch Viscosity | |
|---|---|---|---|---|---|---|
|  |  |  |  |  | 3/250 °F. | 4/250 °F. |
| A | 1210 | 3490 | 580 | 294 | 22 | 29 |
| I | 1400 | 3390 | 540 | 289 | 16 | 28 |
| II | 1470 | 3340 | 573 | 294 | 19 | 28 |
| III | 1400 | 3470 | 570 | 295 | 20 | 29 |
| IV-V | 1470 | 3450 | 555 | 295 | 27 | 26 |

Thus, in operation, a combined carbon black silica pigment is formed by forming a silica slurry and producing a carbon black exhaust gas, then drying the silica slurry in a spray dryer with the heat of the carbon black exhaust gas to form a combined carbon black silica pigment.

While the present invention has been described with reference to specific embodiments, this application is intended to cover those various changes and substitutions which may be made by those skilled in the art without departing from the spirit and scope of the appended claims.

I claim:

1. A method of producing a combined carbon black silica pigment comprising the steps of:
   (a) forming a slurry selected from the group consisting of silica slurry and sodium alumino silicate slurry;
   (b) producing a carbon black exhaust gas in a carbon black furnace by the incomplete combustion of a hydrocarbon feedstock;
   (c) spray drying the silica slurry in a spray dryer with the carbon black exhaust gas as the drying gas to form a combined carbon black silica pigment; and
   (d) collecting the combined carbon black silica pigment.

2. A method according to claim 1 wherein the collected combined carbon black silica pigment is pelletized and dried.

3. A method according to claim 1 wherein the carbon black exhaust gas is quenched prior to entering the spray dryer.

4. A method according to claim 1 wherein the silica is a precipitated silica.

5. A method according to claim 1 wherein the combined carbon black silica pigment has at least 28% by weight silica.

6. A method of producing a combined carbon black silica pigment comprising the steps of:
   (a) forming a silica slurry, wherein said silica has a packed bulk density of from 14 to 17 lbs/cu ft, a density at 25° C. of about 2.0 g/ml, a mean particle diameter of from 14 to 22 milimicrons, an oil absorption of from 170 to 200 cc oil/100 g, a refractive index of about 1.44 and a BET surface area of from 120 to 150 sq m/g;
   (b) producing a carbon black exhaust gas in a carbon black furnace by the incomplete combustion of a hydrocarbon feedstock, wherein said carbon black has a DBP absorption of about 114 cc/100 g black, an iodine surface area of about 122 sq m/g, and a tint factor of 114;
   (c) quenching said carbon black exhaust gas to a temperature of from 800° to 1100° C.;
   (d) spray drying the silica slurry in a spray dryer with a temperature at the slurry inlet of from 480° C. to 820° C. with the carbon black exhaust gas as the drying gas to form a combined carbon black silica pigment having from 26% to 36% by weight silica;
   (e) collecting the combined carbon black silica pigment; and
   (f) pelletizing and drying said collected combined carbon black silica pigment.

* * * * *